United States Patent
Bogin et al.

(10) Patent No.: US 7,082,480 B2
(45) Date of Patent: Jul. 25, 2006

(54) MANAGING BUS TRANSACTION DEPENDENCIES

(75) Inventors: Zohar Bogin, Folsom, CA (US); Serafin E. Garcia, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 319 days.

(21) Appl. No.: 10/674,944

(22) Filed: Sep. 29, 2003

(65) Prior Publication Data

US 2004/0059839 A1    Mar. 25, 2004

Related U.S. Application Data

(62) Division of application No. 09/659,108, filed on Sep. 11, 2000, now Pat. No. 6,694,390.

(51) Int. Cl.
*G06F 3/00* (2006.01)
(52) U.S. Cl. .......................................... 710/52; 710/56
(58) Field of Classification Search ............ 710/52–57
See application file for complete search history.

(56) References Cited

U.S. PATENT DOCUMENTS

| | | | | |
|---|---|---|---|---|
| 5,006,982 A | * | 4/1991 | Ebersole et al. ............ 710/263 |
| 5,467,295 A | * | 11/1995 | Young et al. ................ 709/210 |
| 5,887,194 A | * | 3/1999 | Carson et al. ................ 710/36 |
| 5,930,485 A | * | 7/1999 | Kelly .......................... 710/112 |
| 6,145,032 A | * | 11/2000 | Bannister et al. ............. 710/52 |

* cited by examiner

*Primary Examiner*—Tim Vo
(74) *Attorney, Agent, or Firm*—Blakely, Sokoloff, Taylor & Zafman LLP

(57) ABSTRACT

A combination of techniques to prevent deadlocks and livelocks in a computer system having a dispatcher and multiple downstream command queues. In one embodiment, a broadcast transaction that requires simultaneously available space in all the affected downstream command queues becomes a delayed transaction, so that the command queues are reserved and other transactions are retried until the broadcast transaction is completed. In another embodiment, a bail-out timer is used to defer a transaction if the transaction does not complete within a predetermined time. In yet another embodiment, a locked transaction that potentially addresses memory space controlled by a programmable attribute map is handled as a delayed transaction if there is less than a predetermined amount of downstream buffer space available for the transaction.

9 Claims, 6 Drawing Sheets

MANAGING BUS TRANSACTION DEPENDENCIES

The present patent application is a Divisional of application Ser. No. 09/659,108, filed Sep. 11, 2000, now U.S. Pat. No. 6,694,390, and assigned to the corporate assignee of the present invention.

BACKGROUND OF THE INVENTION

1. Field of the Invention

The invention pertains generally to computer systems. In particular, it pertains to avoiding deadlocks and livelocks in the dispatching and execution of bus transactions.

2. Description of the Related Art

In a continuing attempt to increase performance, many computer systems send bus transactions to a centralized input/output (I/O) controller, which uses multiple queues to dispatch each transaction to one of several different interfaces in the system, and which coordinates execution of various stages of the transaction.

FIG. 1 shows a portion of a conventional computer system containing such a centralized I/O controller 10, which controls the transfer of commands and data between processors 11, 12, graphics controller 13, memory controller 14, and peripheral bus controller 15. Each is connected to I/O controller 10 over a separate interface 21, 23, 24 and 25, respectively, each of which may be a bus.

FIG. 2 shows a more detailed view of I/O controller 10. A request from one of the CPU's 11, 12 to initiate a transaction is decoded by request decoder 111, which loads the request into In-Order Queue (IOQ) 112. IOQ 112 keeps the various phases of multiple transactions executing in the correct order, so that a given phase of a subsequent transaction will not be executed before the same phase of a preceding transaction. This is done by placing the request for the transaction into dispatch queue 113 and response queue 115, and for memory requests, into snoop queue 117 and snoop response queue 119. Although shown and discussed as four separate queues, these may actually be a single queue with four separate pointers indicating which location is considered to be the exit of the queue for each function.

When an indicator exits dispatch queue 113, it triggers dispatcher 114 to send the transaction to the correct interface 23, 24 or 25, through the associated command queue 130, 140, or 150, which queues up the transaction before it is presented to the respective interface. The transactions are "drained" from the command queues as the transactions are serviced by the receiving circuitry. When the target device responds, that response clears the associated request from the exit of response queue 115. If the request is to a memory system with cache, a snoop function and its response are also processed through queues 117, 119. Thus a transaction is completed only when the relevant request has been cleared from all queues in IOQ 112.

Memory transactions through queue 150 are typically guaranteed to complete within a specified time, and occupy processor bus 21 until the transaction is complete. However, transactions through downstream queues 130 and 140 ("downstream transactions") have no guaranteed completion time, and time to complete can vary greatly. Since a target device may not always be ready to accept a command, alternative responses are available to prevent this condition from clogging up the queues. A retry response is a response from the I/O controller to the requestor that tells the requester to abort the request and try again later. This response clears that particular request from all queues in IOQ 112. When the request is retried at a later time, it enters IOQ 112 as a new request. A delayed transaction response includes a retry response, but the I/O controller 10 and the target interface also commit resources to the eventual retry, thus blocking those resources from other transactions and potentially forcing those other transactions to be reattempted. Only one transaction may be delayed at a time. A deferred response does not require a reattempt by the initiator—the I/O controller notifies the initiator that the target device will provide the requested data when it is ready, and the I/O controller will pass the data on to the initiator using a special transaction called a deferred reply. Although the transaction is complete when the request is deferred, the operation continues until the deferred reply, and various resources may remain committed until the deferred reply. In all these cases, the request is cleared from the queues in IOQ 112 when the retry/delay/defer status is created by the response from the I/O controller to the requestor. A request can be initially assigned an identifier, so that if it is reattempted with the same identifier, all affected devices can correlate the reattempt with the original request.

The interactive nature of the various queues and associated resources can cause both deadlocks and livelocks to occur, based on conflicting resource dependencies. As applied to the queue structure, a deadlock occurs when the output of two or more queues cannot be cleared because the data to initiate a clearing action in each is blocked within the other queue. A livelock occurs when a requested transaction cannot make progress in one queue because it depends on another queue which, although moving, is always full and thereby repeatedly forcing some type of reattempt. In brief, a livelock creates an ongoing bottleneck in the system, which may eventually go away in normal operation after an unacceptably long time, while a deadlock causes a blockage in the system that will not go away without some type of overt corrective action.

Some deadlocks and livelocks are generic to a system and can be avoided through proper overall system design. Others are only seen during specific, unusual circumstances and must be addressed with a customized solution on a case-by-case basis.

DETAILED DESCRIPTION OF THE INVENTION

One or more embodiments of the invention are directed to avoiding various types of deadlock/livelock situations through the use of delayed or deferred transactions. These embodiments are explained in more detail below.

End-of-Interrupt Broadcast Command

A broadcast command is a command that is recognized by all (or at least many) of the devices that receive it. A broadcast command allows a general-purpose command to be sent to all relevant devices without having to maintain a list of those devices, and without having to send individually-addressed messages to each device on the list. A broadcast command typically contains a destination address that is recognized by all intended target devices. Since a broadcast command may be seen and used by many devices, it is generally not feasible for the sender to determine if all relevant devices have responded, and in some embodiments no response at all is required.

An End-of-Interrupt command is a broadcast command that indicates the CPU has completed processing of an interrupt. It can be broadcast to all buses where an interrupt controller (i.e., a device that can generate an interrupt) might be attached. For proper execution, space for this command must be simultaneously available in all downstream command queues 130, 140 when the command is dispatched. If one or more downstream command queues is full or otherwise unavailable, it may not be feasible for the IOQ to hold this command while waiting for the downstream command queues to drain, since the IOQ itself may contain the request, or be blocking the CPU or upstream processor bus request, needed to initiate draining of the blocked downstream command queue, thus creating a deadlock. On the other hand, forcing a retry of the EOI command can create a livelock because other competing commands, such as those not requiring multiple simultaneous queue space availability, can repeatedly refill the downstream command queues before the EOI is reattempted.

Figure 1:
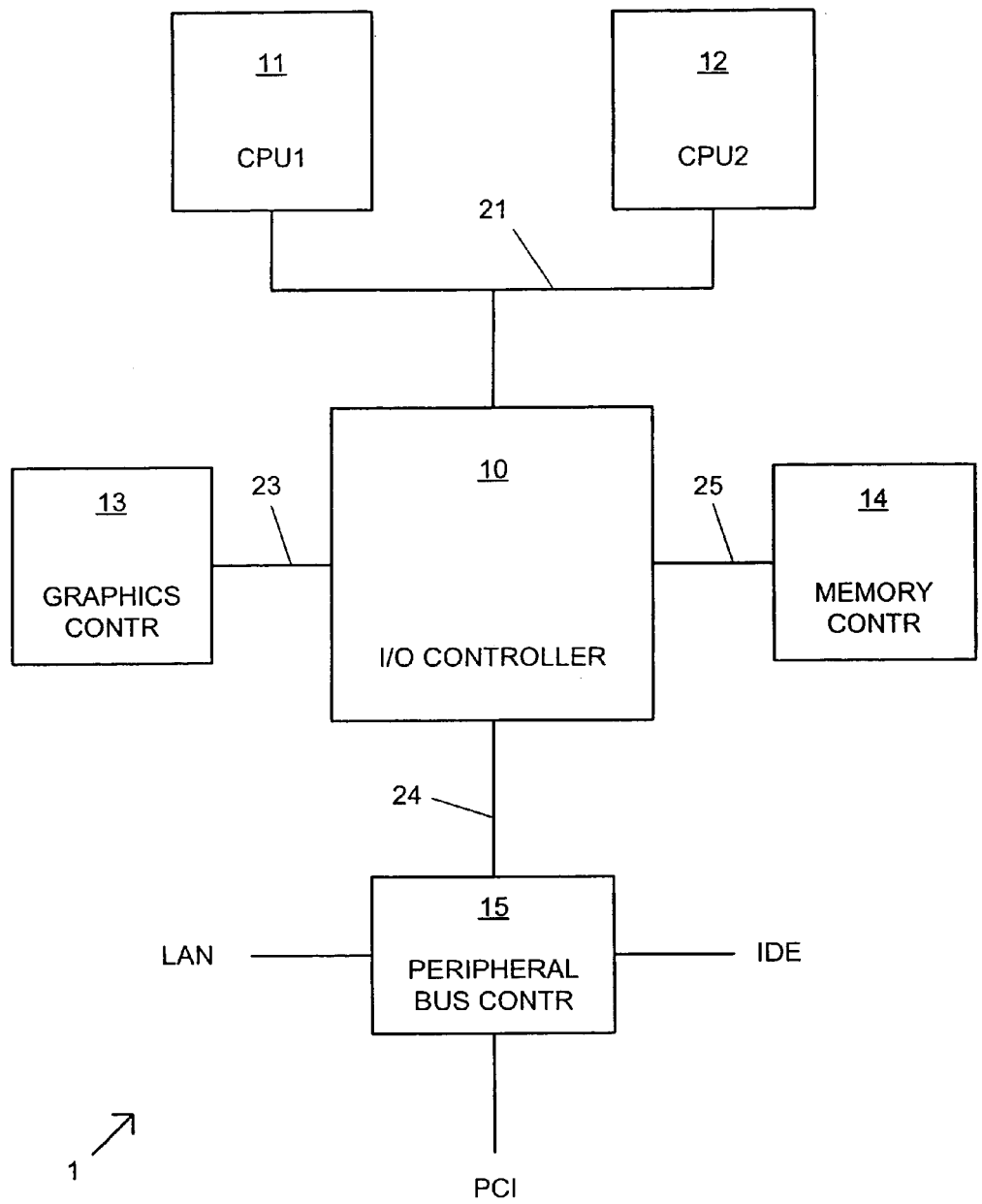
FIG. 1 shows a system of the prior art.
Figure 2:
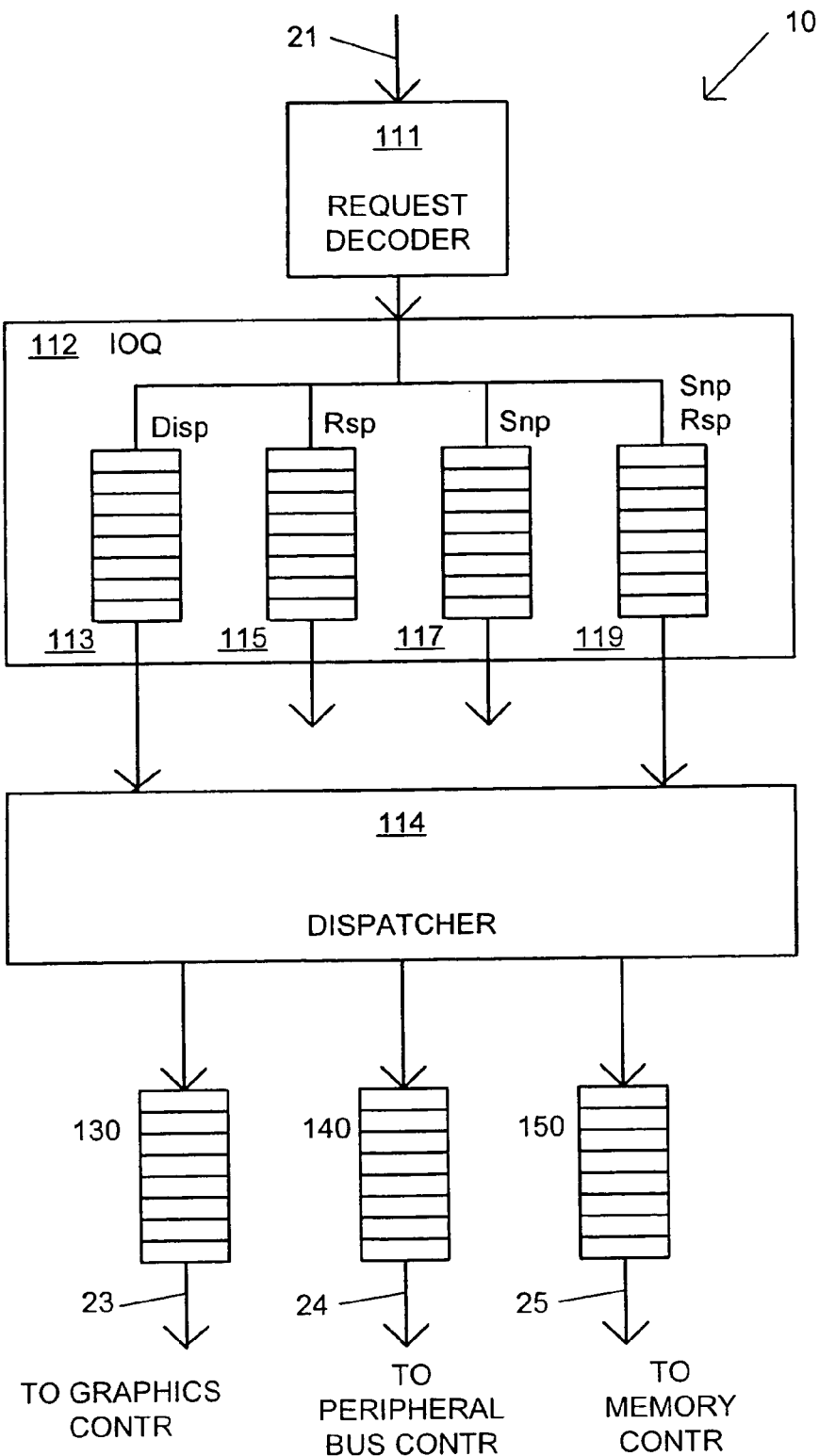
FIG. 2 shows an I/O controller of the prior art.
Figure 3:
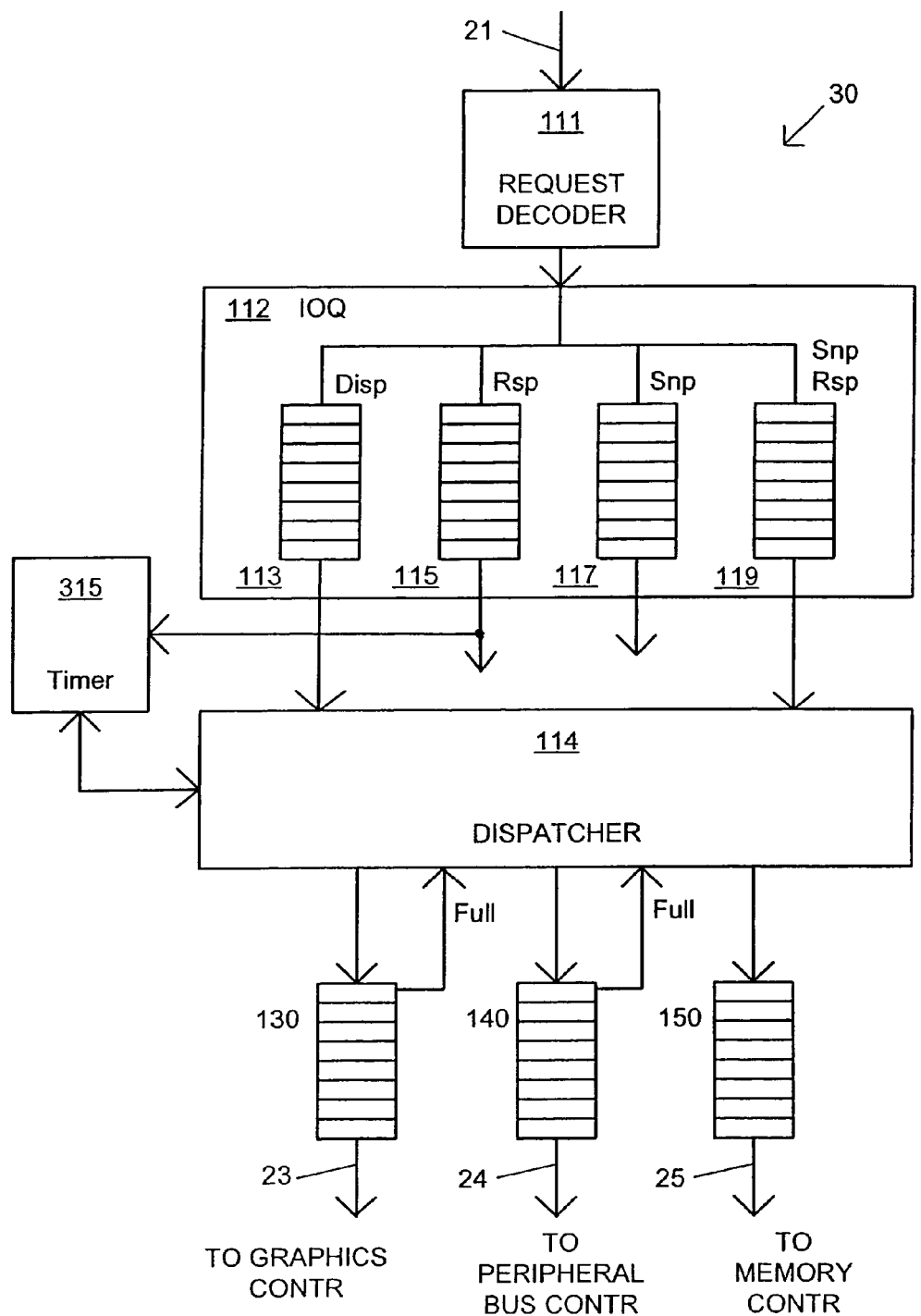
FIG. 3 shows an I/O controller of the invention.
Figure 4:
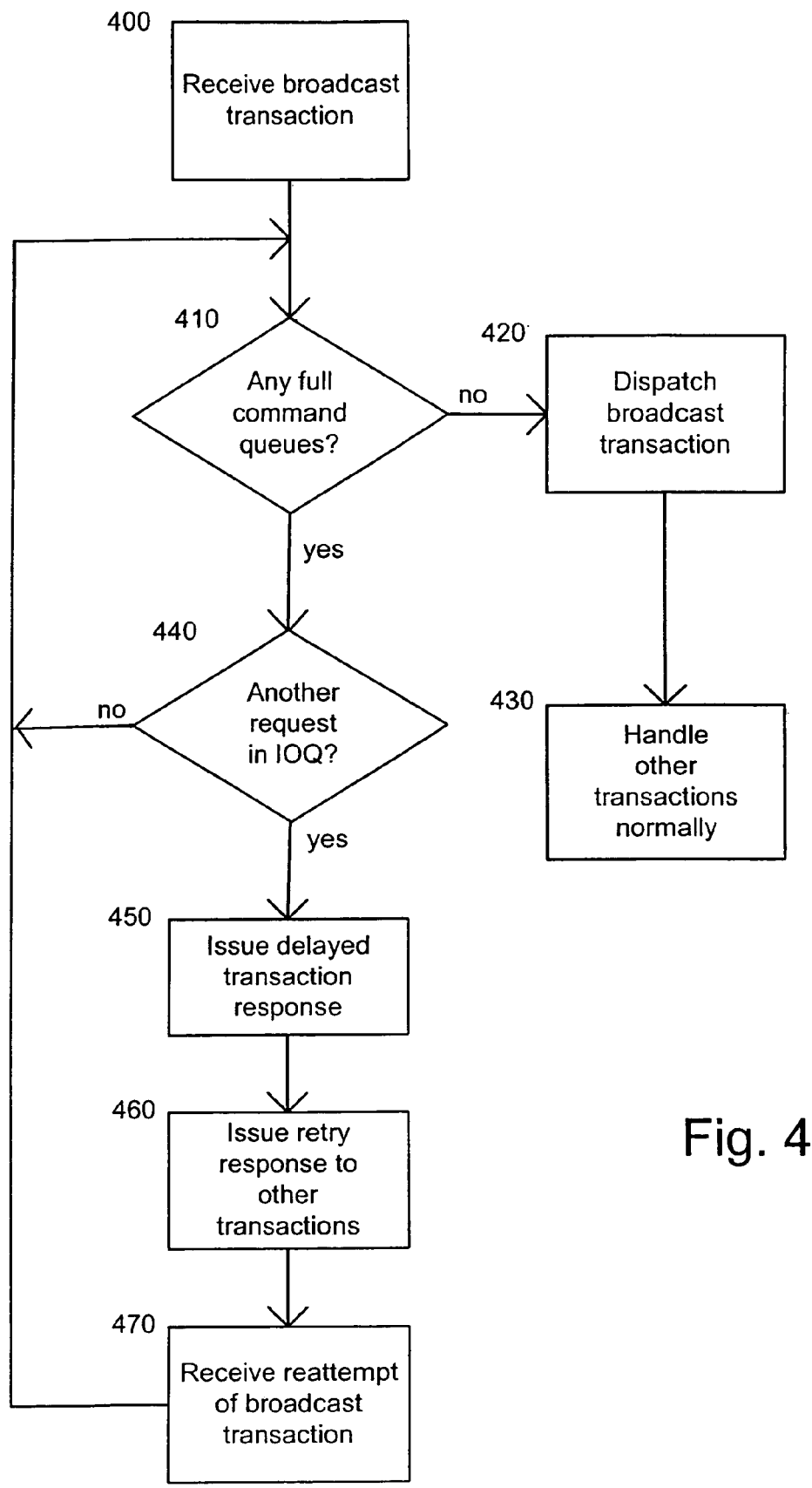
FIG. 4 shows a flow chart for handling a broadcast transaction.

FIGS. 3 and 4 illustrate one embodiment of the invention, which uses the delayed transaction mechanism to guarantee available resources for the EOI request. As shown in FIG. 3, each of queues 130, 140 provide an indicator back to dispatcher 114 when they are full so that dispatcher 114 will not dispatch a transaction into a queue that has no place to put it. If one or more downstream command queues is full, dispatcher 114 can hold the EOI transaction while waiting for the queues to drain, provided no other commands are pending. However, if any other CPU request is received, I/O controller 10 can use its internal logic to terminate the transaction by sending a delayed transaction response back to the requestor. A delayed transaction response is essentially a retry response, except the necessary resources are reserved for the eventual retry attempt. In this case, downstream command queue space is reserved. Therefore, other requests requiring one of the downstream command queues can themselves be directed to retry as long as the delayed transaction is pending. This prevents other requests from repeatedly filling the downstream command queues, and allows these queues to drain. In this case, 'other requests' also includes other EOI commands, which can be differentiated from the subject EOI command by their transaction identifiers.

Eventually, the subject EOI command will be reattempted while space is simultaneously available in all the downstream command queues. The EOI command can then execute successfully. Once it does, the delayed operation is complete and the other devices will no longer be forced to retry.

FIG. 4 shows a procedure that can be followed by this process. At step 400, a broadcast transaction is initiated by loading it into IOQ 112. When it reaches the exit of dispatch queue 113, dispatcher 114 determines at step 410 if any of the downstream command queues 130, 140 are full. If none are full, i.e., if there is space in all downstream command queues hold a transaction, the broadcast transaction is dispatched to the downstream command queues at step 420, and any subsequent transactions are also handled normally at step 430. However, if step 410 determines that at least one of the downstream command queues is full, the IOQ is checked at step 440 to see if any other requests are pending. If not, the system loops through steps 410 and 440 while waiting for the command queues to drain so the broadcast transaction can be dispatched. If another request is detected in the IOQ, either before or during this looping operation, a delayed transaction response is issued to the requestor at step 450. The downstream command queues are now reserved for the eventual reattempt of the broadcast transaction, and any other transactions that subsequently reach dispatcher 114 and require one of the downstream command queues 130, 140 can be given a retry response at step 460 to prevent them from filling up the command queues. At step 470, the broadcast transaction is eventually retried. As before, if all command queues have space, the retried broadcast transaction is dispatched and any subsequent transactions are then handled normally. If at least one of the downstream command queues is still full, the delayed transaction cycle repeats until all queues have space to accept the broadcast command.

Deferrable Transaction Bail-Out Timer

A deadlock can also occur when the IOQ depth is configured to 1 (meaning each of queues 113, 115, 117 and 119 can only contain one entry—in certain situations this is desirable), and a non-postable downstream transaction's completion is blocked by a downstream agent's need to access main memory via processor bus 21. A non-postable transaction is a transaction that must wait for a response, so IOQ 112 must wait for a response before permitting any other transactions to proceed. The non-postable transaction cannot be deferred because the I/O controller's conventional defer policy requires that another request be present in the IOQ before it defers the current request at the outlet of the dispatch queue. Since another request cannot arrive when the IOQ is set to 1, this condition for deferral will never be true.

The invention can use a timer to handle this situation. Timer 315 in FIG. 3 starts counting whenever a deferrable request is dispatched. Deferrable transactions can include, for example, non-locked CPU-to-peripheral reads and CPU-to-peripheral I/O type writes. If the transaction is completed (i.e., the response is received from the destination device) before the timer expires, the timer can be disabled, as it is no longer needed. However, if the timer expires before a response is received from the destination device, the transaction can be unconditionally deferred, thus "bailing out" of the original transaction. The expiration time on the timer can be programmable, and the timer may be enabled and disabled via configuration programming. This approach has the advantage of initiating the deferred state only if it is potentially needed to resolve a deadlock or livelock. If the transaction executes in a reasonable time, the timer never expires and the transaction is never deferred. Since deferral creates delays in execution, this process avoids unnecessary delays. On the other hand, if the transaction does not execute in a reasonable time, then a deadlock or livelock situation is likely, and the deferral acts to break the deadlock/livelock. While the above description assumes an IOQ depth of 1, the bail-out timer can also be used when the IOQ depth is greater than 1 for the purpose of avoiding other deadlock or livelock conditions.

Figure 5:
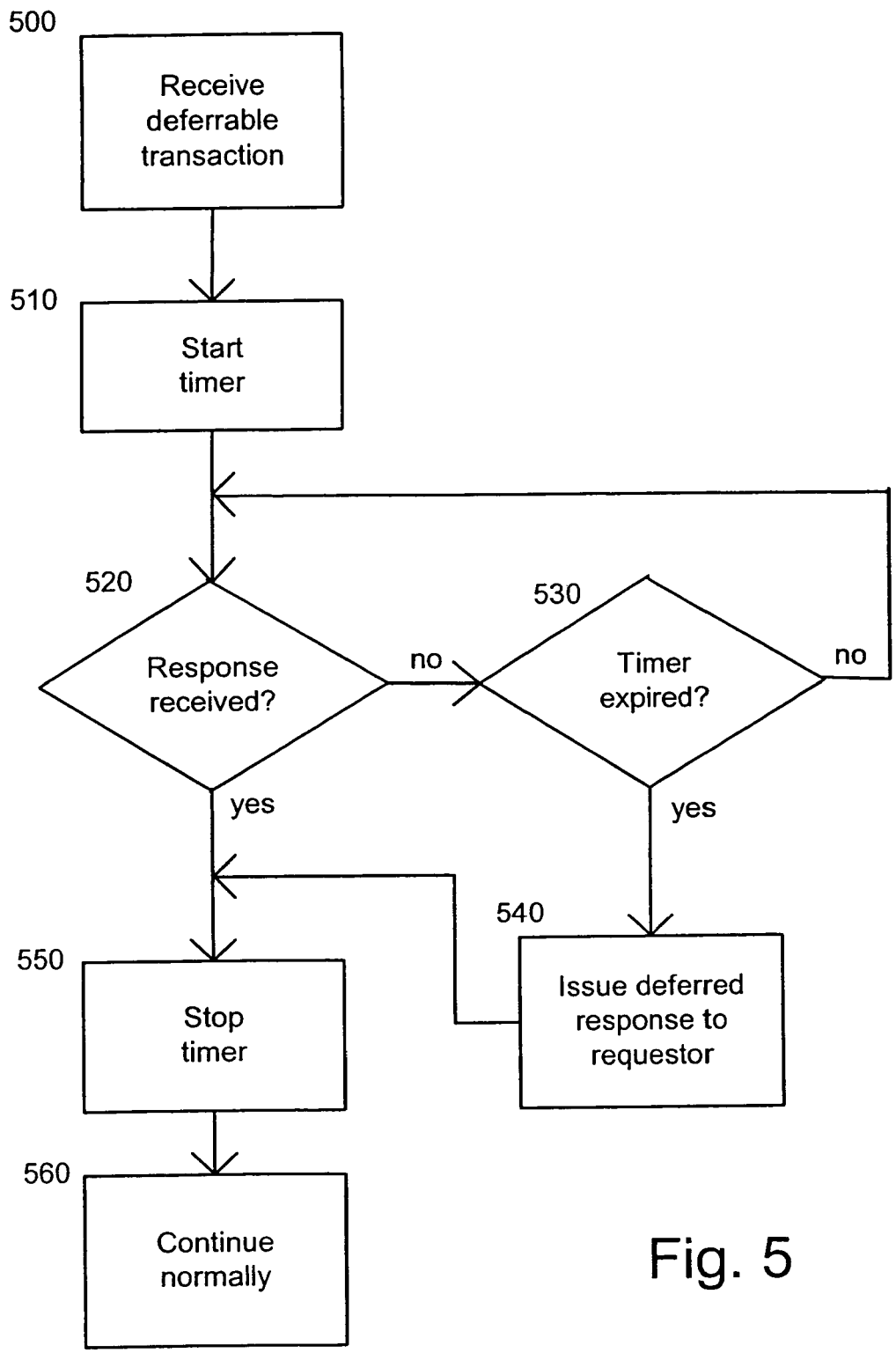
FIG. 5 shows a flow chart for using a bail-out timer.

FIG. 5 shows a procedure that can be followed by this process. When a deferrable transaction is dispatched at step 500, the bail-out timer is started at step 510. The system will then loop through steps 520 and 530 while waiting for a response to be received or the timer to expire. If a response is received at step 520 before the timer expires, the timer is stopped at step 550 and processing continues normally at step 560. However, it the timer expires at step 530 before the response is received, a deferred response is issued to the requestor at step 540, whereupon the timer is stopped and processing continues normally for a deferred transaction.

Delayed Transaction of Initial Locked Reads due to Write Data Buffer Unavailability A "locked" command is one that locks up the required resources, making them unavailable to other transactions, until a given sequence of commands completes. For example, a locked request from a CPU to a peripheral controller might lock up processor bus 21, peripheral downstream command queue 150, peripheral bus 25, and the peripheral controller, thus preventing other devices from using those resources until the locked command has completed and the resources are unlocked. In a conventional system, an initial locked read is converted to a delayed transaction upon the arrival of any upstream request, or when a deferred transaction is outstanding, or when downstream command queue space is unavailable. This prevents known deadlock conditions due to resource conflicts. However, it does not address a situation in which a locked sequence addresses the region of memory controlled by the programmable attribute map (PAM), in which a read and a write may be directed to two different command queues. A PAM defines a section of address space in which a read and a write to two interfaces are both executed with a single atomic instruction. At least one of these interfaces is the memory interface, but the other can be one of the downstream command queues. Under these conditions, if an initial locked read is addressed to PAM-controlled memory, it is possible that the corresponding locked write will be directed towards a downstream interface without available command or data queue space. Due to known dependency rules, this downstream command queue should remain unblocked and eventually drain to make room for the write request. This, however, can take a significant amount of time, all the while blocking other unrelated memory-bound transactions on the processor bus, thereby hurting overall system performance.

In one embodiment, logic determines if sufficient downstream write data buffer space and sufficient downstream command buffer space is available for the locked write that is associated with an initial locked memory-bound read transaction that is potentially within programmable attribute map space. In one embodiment, two chunks of write data buffer space and two slots of command buffer space is considered sufficient. If both conditions are met, the read request can be accepted. Otherwise, the read transaction can become a delayed transaction. The delayed transaction can reserve the downstream queue so that it will drain to make room for the write transaction when it is reattempted.

In one embodiment, potential PAM space rather than actual PAM space is detected. Since PAM space can be segmented into multiple disjointed areas, a single address space that encompasses all the possible PAM spaces simplifies the detection process, with minimal penalty for occasionally creating a delayed transaction when the target address was not within actual PAM space.

Figure 6:
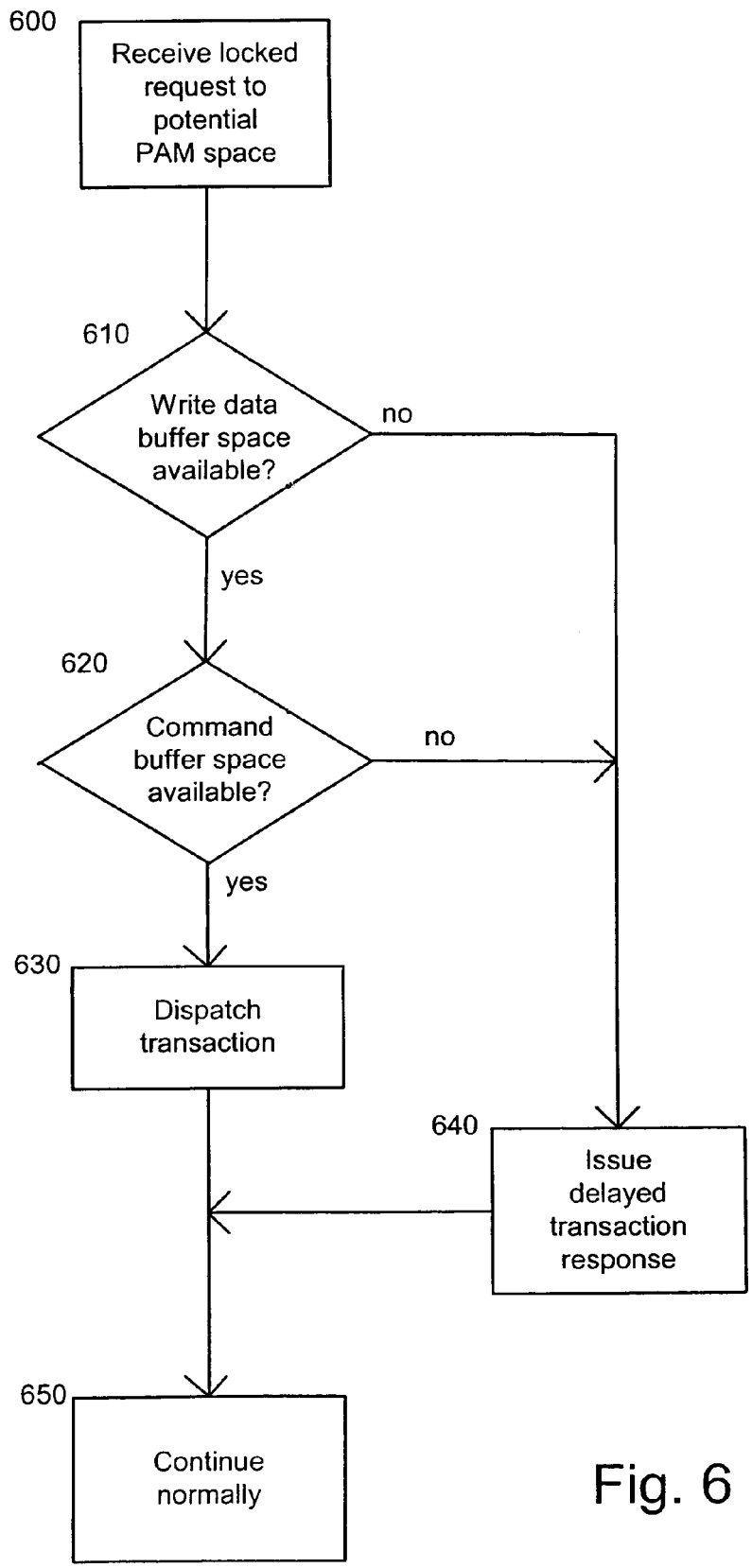
FIG. 6 shows a flow chart for handling a locked request to PAM space.

FIG. 6 shows a procedure that can be followed by this process. At step 600, a locked request to potential PAM space is initiated. Step 610 checks to see if sufficient write data buffer space is available, while step 620 checks to see if sufficient command buffer space is available. If both are sufficient, the locked transaction is dispatched at step 630, and subsequent processing continues normally. However, if there is insufficient write data buffer space or insufficient command buffer space available for the locked request, a delayed transaction response is issued at step 640. At step 650, processing then continues normally for a delayed transaction.

The embodiments involving broadcast commands, a bail-out timer, and locked reads to PAM space can be implemented individually or in any combination.

The invention can be implemented in circuitry or as a method. The invention can also include instructions stored on a machine-readable medium, which can be read and executed by at least one machine to perform the functions described herein. A machine-readable medium includes any mechanism for storing or transmitting information in a form readable by a machine (e.g., a computer, state machine or programmable logic). For example, a machine-readable medium can include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

The foregoing description is intended to be illustrative and not limiting. Variations will occur to those of skill in the art. Those variations are intended to be included in the invention, which is limited only by the spirit and scope of the appended claims.

We claim:

1. A method, comprising:
   receiving a broadcast transaction from a requestor in a computer system;
   determining if a command queue is full;
   dispatching the broadcast transaction to a plurality of command queues if each of plurality of the command queues is not full; and
   issuing a delay transaction response to the requestor if the command queue is full.

2. The method of claim 1, wherein the broadcast transaction is an End-of-Interrupt transaction.

3. The method of claim 1, further comprising:
   forcing other transactions to retry if the delay transaction response was issued;
   receiving a retry of the broadcast transaction from the requestor if the delay transaction response was issued; and
   dispatching the retried broadcast command to the command queue if the command queue is not full.

4. An apparatus, comprising:
   a plurality of command queues coupled to a detector to detect if a command queue of the plurality is full;
   a command dispatcher coupled to the plurality of the command queues and the detector, the command dispatcher including:
      logic to dispatch a broadcast command from a requestor to the plurality of the command queues if each of the plurality of the command queues is not full; and
      logic to respond to the requestor with a delay transaction response if the command queue is full.

5. The apparatus of claim 4, wherein the broadcast command is an End-of-Interrupt transaction.

6. The apparatus of claim 4, further including logic to force a retry of subsequent commands until a retried broadcast command has been dispatched to the command queue.

7. A machine-readable medium having stored thereon instructions, which when executed by at least one machine cause said at least one machine to perform:

receiving a broadcast transaction from a requestor in a computer system;

determining if a command queue is full;

dispatching the broadcast transaction to a plurality of command queues if each of the plurality of the command queues is not full; and issuing a delay transaction response to the requestor if the command queue is full.

8. The medium of claim 7, wherein the broadcast transaction is an End-of-Interrupt transaction.

9. The medium of claim 7, further comprising:

forcing other transactions to retry if the delay transaction response was issued;

receiving a retry of the broadcast transaction from the requestor if the delay transaction response was issued; and dispatching the retried broadcast command to the command queue if the command queue is not full.

* * * * *